Oct. 18, 1949.     J. M. ANDREAS     2,484,871

DEVICE FOR REGISTRATION OF SUPERIMPOSED FILMS

Filed June 5, 1946

Inventor
John M. Andreas
by Roberts, Cushman & Groover
att'ys.

Patented Oct. 18, 1949

2,484,871

UNITED STATES PATENT OFFICE 2,484,871

DEVICE FOR REGISTRATION OF SUPERIMPOSED FILMS

John M. Andreas, Pasadena, Calif., assignor to Technicolor Motion Picture Corporation, Hollywood, Calif., a corporation of Maine Application June 5, 1946, Serial No. 674,558

6 Claims. (Cl. 271—2.6)

In the art of cinematography it has been proposed to feed films together continuously and then, while they are in intimate contact with each other, conduct them through a predetermined path. One example of such practice is in the art of imbibition printing where a dye-soaked matrix is pressed into contact with a dye-absorptive blank and then, while the two stick together, they are conducted through a path long enough to permit the dye to be imbibed by the blank from the matrix. Another example is in the art of transferring a layer of emulsion from one film to another. In all of these practices it is necessary to bring the two films into contact in precise registry with each other, this usually being accomplished by pins or teeth fitting into the sprocket holes of the films. In order to obtain accurate registration it is necessary for the teeth to fit the sprocket holes closely, although in some cases the pins need fit the sprocket holes closely only in one dimension of the holes. Because of this close fit and the delicate nature of motion picture film, especially when wet, difficulty has been experienced in getting the teeth fully inserted in the sprocket holes with the films pressed into intimate contact with each other. If the films are not thus tightly pressed together they tend to curl away from each other at the edges as they travel along the aforesaid path, and this interferes with the imbibition process or other operation being performed.

Objects of the invention are to provide apparatus which continuously places two or more cinematographic films in registered contact with each other, which effects the registration accurately and without damage to the films, which seats the two films tightly against each other throughout their entire width including their margins, and which prevents the films from peeling apart at the edges as they travel along together.

According to the present invention the apparatus comprises a row of sprocket-hole teeth adapted to extend into the sprocket holes of the films and two rolls for pressing the films together with the teeth extending into the sprocket holes, the roll on the side of the films from which the teeth enter the sprocket holes being recessed to receive the margins of the films and the other roll being correspondingly raised, so that the teeth may be fully inserted in the sprocket holes of the films and the margins of the films may be pressed into intimate contact with each other. While the teeth may be mounted on the recessed roll they are preferably disposed on a flexible belt which feeds between the rolls along with the films, the films being fed to the belt either at the rolls or preferably somewhat in advance of the rolls. In the case of a belt the margin of the belt carrying the teeth is offset toward the back side of the belt from the teeth to the edge of the belt so that the margins of the films may be pressed on the teeth beyond the front face of the belt. After the films pass between the rolls the films may spring back, by virtue of their own elasticity, into alignment with their central portions or to some intermediate position.

For the purpose of illustration a typical embodiment of the invention is shown in the accompanying drawings in which Fig. 1 is a diagram representing a belt machine of the character referred to;

Figure 1:
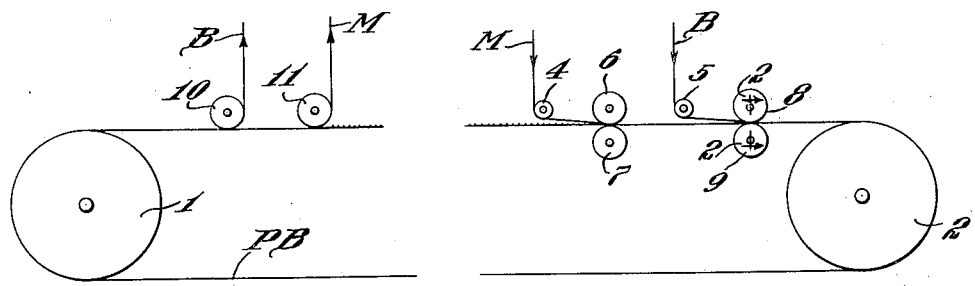

The particular embodiment of the invention chosen for the purpose of illustration comprises a machine having two spaced rolls or drums 1 and 2 over which is trained a pin belt PB having pins or teeth 3 along its margins, guide rolls 4 and 5 over which two films M and B are guided to the pin belt, two rolls 6 and 7 for seating the film M on the belt, two rolls 8 and 9 for seating the film B on the belt, and two guide rolls 10 and 11 for guiding the films away from the pin belt after it has traversed most of its orbit. Various details of construction of machines of this type are disclosed in prior Patents 1,675,743, 1,704,328, 1,707,695, 1,707,699, 1,707,710, 1,707,733, 1,928,714, 2,257,254, 2,271,572. Various uses of such machines are disclosed in Patent 2,369,176. In printing pictures by imbibition the film B may comprise a dye-absorptive blank film and the film M a dye-soaked matrix.

Figures 2, 3:
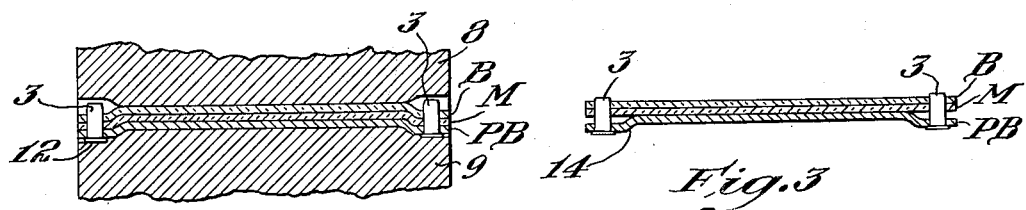
Fig. 2 is a section on line 2—2 of Fig. 1.
Fig. 3 is a section like Fig. 2 with the rolls omitted.
Figure 4:
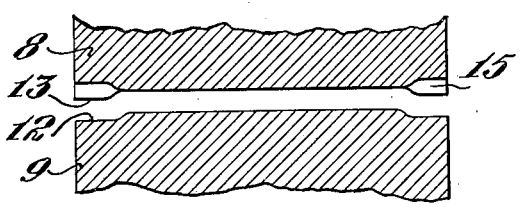
Fig. 4 is a similar section with the belt and films omitted.
Figure 5:
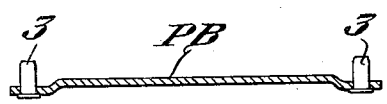
Fig. 5 is a section of the belt alone.
Figure 6:
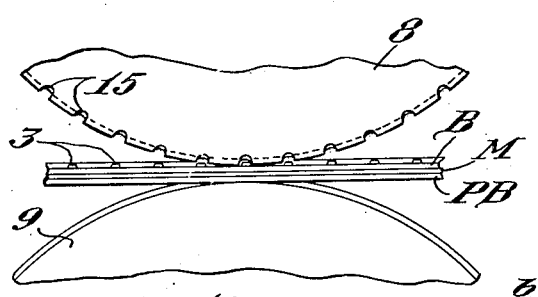
Fig. 6 is a side view of the parts shown in Fig. 2.

According to the present invention the lower roll of each of the two pairs of seating rolls comprises a shallow recess 12 along each side and the upper roll of each pair has a corresponding raised portion 13. The pin belt PB is offset along each margin, as indicated at 14, to correspond with the transverse contour of the seating rolls. As the films approach the seating rolls they seat flatwise on the raised central portion of the belt as illustrated in Fig. 3. However as they pass between the seating rolls their margins are pressed down to the bottom of the recesses 12, thereby tightly seating the films against each other, along their margins as well as along their central portions. After the belt and films pass beyond the seating rolls 8 and 9 the films may spring back more or less to the position shown in Fig. 3 but, having been pressed tightly together well down on the pins, they do not tend to separate as they travel around the orbital path with the pin belt.

It should be understood that the present disclosure is for the purpose of illustration only and that this invention includes all modifications and equivalents which fall within the scope of the appended claims.

I claim:

1. Apparatus of the character referred to comprising means for continuously placing two cinematographic films in registered contact with each other which comprises a row of sprocket-hole teeth adapted to extend into the sprocket holes of the films, and two rolls for pressing the films together with the teeth extending into the sprocket holes, the rolls having juxtaposed surfaces for pressing the films together between the rows of sprocket holes and also outside the rows of sprocket holes, the roll on the side of the films from which the teeth enter the sprocket holes being recessed from the sprocket holes to the margins of the films and the other roll being correspondingly raised, whereby the teeth may be fully inserted in the sprocket holes of the films and said margins of the films may be pressed into intimate contact with each other.

2. Apparatus of the character referred to comprising means for continuously placing two cinematographic films in registered contact with each other which comprises a flexible belt having a row of sprocket-hole teeth adapted to extend into the sprocket holes of the films, and two rolls for pressing the films and belt together with the teeth extending into the sprocket holes, the rolls having juxtaposed surfaces for pressing the films together between the rows of sprocket holes and also outside the rows of sprocket holes, the roll on the side of the films from which the teeth enter the sprocket holes being recessed from the sprocket holes to the margins of the films and the other roll being correspondingly raised, whereby the teeth may be fully inserted in the sprocket holes of the films and said margins of the films may be pressed into intimate contact with each other.

3. Apparatus of the character referred to comprising means for continuously placing two cinematographic films in registered contact with each other which comprises a flexible belt having a row of sprocket-hole teeth adapted to extending into the sprocket holes of the films, and two rolls for pressing the films and belt together with the teeth extending into the sprocket holes, the rolls having juxtaposed surfaces for pressing the films together between the rows of sprocket holes and also outside the rows of sprocket holes, the roll on the side of the films from which the teeth enter the sprocket holes being recessed from the sprocket holes to the margins of the films and the other roll being correspondingly raised, the raised portion of said other roll having recurrent recesses to receive the free ends of the teeth projecting through the films.

4. Apparatus of the character referred to comprising means for continuously placing two cinematographic films in registered contact with each other which comprises a flexible belt having a row of sprocket-hole teeth adapted to extend into the sprocket holes of the films, and two rolls for pressing the films and belt together with the teeth extending into the sprocket holes, the rolls having juxtaposed surfaces for pressing the films together between the rows of sprocket holes and also outside the rows of sprocket holes, the roll on the side of the films from which the teeth enter the sprocket holes being recessed from the sprocket holes to the margins of the films and the other roll being correspondingly raised, and the margin of the belt being correspondingly offset, whereby the teeth may be fully inserted in the sprocket holes of the films and said margins of the films may be pressed into intimate contact with each other.

5. Apparatus of the character referred to comprising means for continuously placing two cinematographic films in registered contact with each other which comprises a flexible belt having a row of sprocket-hole teeth adapted to extend into the sprocket holes of the films, and two rolls for pressing the films and belt together with the teeth extending into the sprocket holes, the rolls having juxtaposed surfaces for pressing the films together between the rows of sprocket holes and also outside the rows of sprocket holes, the roll on the side of the films from which the teeth enter the sprocket holes being recessed from the sprocket holes to the margins of the films and the other roll being correspondingly raised, and the margin of the belt being correspondingly offset, the raised portion of said other roll having recurrent recesses to receive the free ends of the teeth projecting through the films.

6. Apparatus of the character referred to comprising means for holding two cinematographic films in registered contact with each other which comprises a flexible belt having a row of sprocket-hole teeth adapted to extend into the sprocket holes of the films, the margin of the belt carrying said teeth being offset toward the back side of the belt from the teeth to the edge of the belt.

JOHN M. ANDREAS.

REFERENCES CITED

The following references are of record in the file of this patent:

UNITED STATES PATENTS

| Number | Name | Date |
|---|---|---|
| 2,257,254 | Whittaker | Sept. 30, 1941 |